United States Patent
Donoghue et al.

(10) Patent No.: US 6,751,700 B2
(45) Date of Patent: Jun. 15, 2004

(54) DATE PROCESSOR AND STORAGE SYSTEM INCLUDING A SET ASSOCIATIVE CACHE WITH MEMORY ALIASING

(75) Inventors: Bryan J Donoghue, St. Albans (GB); Lee C Harrison, Chelmsford (GB); Edward Turner, Maidenhead (GB); Tin Lam, London (GB); Victoria A Griffiths, Pitstone (GB)

(73) Assignee: 3Com Corporation, Santa Clara, CA (US)

( * ) Notice: Subject to any disclaimer, the term of this patent is extended or adjusted under 35 U.S.C. 154(b) by 432 days.

(21) Appl. No.: 09/822,244

(22) Filed: Apr. 2, 2001

(65) Prior Publication Data

US 2002/0116581 A1 Aug. 22, 2002

(30) Foreign Application Priority Data

Feb. 21, 2001 (GB) ............................................. 0104228

(51) Int. Cl.[7] .............................................. G06F 12/00
(52) U.S. Cl. ............................ 711/3; 711/128; 711/210
(58) Field of Search ............................... 711/3, 128, 210

(56) References Cited

U.S. PATENT DOCUMENTS

| | | | | |
|---|---|---|---|---|
| 5,109,335 A | * | 4/1992 | Watanabe | ....................... 711/3 |
| 5,119,290 A | * | 6/1992 | Loo et al. | ..................... 711/210 |
| 5,550,995 A | | 8/1996 | Barrera et al. | .................. 711/3 |
| 5,933,844 A | | 8/1999 | Young | ............................ 711/3 |
| 6,061,774 A | * | 5/2000 | Witek | .......................... 711/210 |
| 6,493,812 B1 | * | 12/2002 | Lyon | .......................... 711/207 |

* cited by examiner

Primary Examiner—Glenn Gossage
(74) Attorney, Agent, or Firm—Nixon & Vanderhye P.C.

(57) ABSTRACT

A data processor and storage system which comprises a data processor, a cache memory and a main memory is arranged so that the addressing of the main memory produces a multiplicity of spaced aliases, the multiplicity being greater than the set-associativity of the cache memory. The cache memory may be a multiple way set associative cache memory with the system including a round robin allocator for controlling the storing of successive data items in the different ways of the set associative cache. The cache may also be a direct mapped cache having single way setassociativity so that the round robin allocator is not required. The system may also include a direct memory access (DMA) device for copying data items into the memory. The memory may be a buffer memory which is divided into a plurality of packet buffers.

2 Claims, 3 Drawing Sheets

DATE PROCESSOR AND STORAGE SYSTEM INCLUDING A SET ASSOCIATIVE CACHE WITH MEMORY ALIASING

FIELD OF THE INVENTION

This invention relates to processor systems which include a cache memory and a main memory and in particular to the aliasing of entries in the main memory to avoid the reading of incorrect cache entries by a processor.

BACKGROUND OF THE INVENTION

In the current state of technological development, memories such as are employed, for example, for the storage of packet data in network switches and similar contexts in general operate at a lesser rate than microprocessors. More particularly, microprocessors can request memory accesses at a rate approximately an order of magnitude faster than a rate at which random accesses can be performed in a typical memory. Accordingly, a microprocessor is commonly provided with a cache memory, that is to say a small very fast memory that can, for example, retain copies of recently used memory values or which can retain copies of data such as data packets written to memory. The cache memory operates transparently to the programmer, automatically deciding which values to keep and which to overwrite. It may, though need not be, be implemented on the same chip as the microprocessor. Caches are beneficial particularly where programs display a property known as 'locality' which means that any particular time they tend to execute the same instructions many times on the same areas of data.

Since a processor can operate at a high clock rate only when the memory items it requires are held in the cache, the overall system performance depends strongly on the proportion of memory accesses which cannot be satisfied by the cache. An access to an item which is in the cache is called a 'hit'. An access to an item which is not in the cache is a 'miss'. Systems are designed so that a fetch instruction from the microprocessor is initially directed to the cache and only if the cache returns a 'miss' will the microprocessor need to have recourse to the main and slower memory.

Caches may be organized so that a single cache may store both copies of instructions and copies of 'data'. For the sake of convenience, and to avoid ambiguity in the use of the term 'data', it will be presumed that the 'data' other than instruction data will be packet data, and particularly header data (such as addresses, or status words) since in a network switch it is this type of data which needs to be examined or processed, particularly for the purpose of determining the destination or destinations of a packet.

The simplest form of cache is a direct mapped cache. In such a cache a line of data is stored along with an address tag in a memory which is addressed by some portion of the memory address; this portion is known as the index. To check whether or not a particular address location is stored in a cache, the index address bits are used to access the cache entry. The top address bits are then compared with the stored tag. If they are equal, the item is in the cache. The 'lowest' address bits can be used to access the desired item within the line.

It is often preferable to employ what is known as set-associative cache, because the simple direct-mapped cache is subject to 'contention'. An N-way set associative cache (N being an integer greater than one) is constituted by N direct mapped caches operating in parallel. An address presented to the cache may find its data in any of the N direct mapped caches or 'sets', so each memory address may be stored in one of several places. The access time for a multiple-way set-associative cache is slightly longer than that of the simple direct-mapped cache, the increase being due to the need to multiplex the data from the sets.

A set-associative cache having multiple associativity may typically comprise up to four direct-mapped caches operating in parallel, the associativity being then four. Associativities greater than four are feasible but are in general not preferred because the benefits of going beyond four-way associativity are small and in general do not warrant the extra complexity incurred.

When a new data item is to be placed in a multiple-way set-associative cache, a decision must be taken as to which of the individual caches the data item is to be placed in. It is known to employ random allocation, a least recently used (LRU) algorithm and a round-robin algorithm. As will be seen, if a multiple-way set-associative cache is employed in the present invention it is necessary to employ a round-robin allocation scheme. Such a scheme maintains a record of which location was last allocated and allocates new data to the next individual cache in a cyclic sequence.

In practical systems, a DMA (Direct Memory Access) device is often used to copy data items into main data memory on the system bus. In such systems there is no coupling between the DMA device and cache, so the cache will receive no signal indicating that the contents of main data memory have changed. The contents of the cache will thus be inconsistent with the contents of the main memory. It is therefore important that the cache is disabled for areas of memory where the DMA device copies in new data. The disabling of the cache results in a reduction in performance of processor access to this input or output data.

Some processors use input and output data intensively; an example is a network processor constituted by a RISC (Reduced Instruction Set Computer). It is desirable to enable or facilitate caching of input and output data without the loss of performance.

When a packet of data arrives at an input port, the input port will assert a signal (rx_packet_ready). This signal is sent to the DMA device. On receiving the assertion of rx_packet_ready the DMA device will copy the packet from the input port to a packet buffer in the main buffer memory on the system bus. Once the DMA device has completed copying the packet it will inform the processor via an interrupt signal. The processor will respond to the interrupt by reading a (known) register in the DMA device which will return the memory address pointer of the packet buffer. The address pointer is used by the processor to access the start of the packet data.

The first time that the processor accesses packet data, the cache will recognize that it has not read data from this memory location and will make a copy of the data and store it in the cache. The cache data is therefore initially consistent with the data in the buffer memory.

The processor will complete processing the relevant packet data, with recourse to the copy of the data in the cache memory. After the processing of the packet data the processor may direct the DMA device to copy the packet to a port.

Some time later when a new packet arrives at a port, the specific packet buffer will be reused. The DMA device will copy the new packet to that packet buffer and will notify the processor and pass to the processor the same address pointer to the packet buffer. However, the cache will assume that it holds the data in cache and will therefore return the wrong data to the processor.

A software solution to the problem is possible. More particularly, the processor could flush the cache before it reads data for a new packet. However, the present invention is directed to providing a hardware solution which does not require flushing of the cache in these circumstances and is independent of the software for the microprocessor.

SUMMARY OF THE INVENTION

The present invention relies on the aliasing of an entry in the main memory. In particular, where the associativity of the cache is N, the aliasing in memory should be at least N+1.

In such a scheme, each time a DMA controller loads a new packet into the packet buffer it will increment the address pointer to the next alias of the packet buffer in memory. The cache identifies whether it stores data simply from the memory address. Since the address pointer is for a different address, the cache will recognize it as a new address and will load the data afresh into the cache. The data will be loaded into the cache in the same index line but in a different associativity set. Since there are a limited number of aliases the pointer will eventually wrap around to the initial value. The original cache data is guaranteed to be overwritten provided that the associativity of the cache is less than the multiplicity of aliasing in the main memory and either the cache is a direct-mapped cache (i.e. has single-way set associativity) or the cache has multiple-way set-associativity and the cache replacement algorithm is 'round-robin'.

Further features of the invention will be apparent from the following detailed description with reference to the accompanying drawings.

DETAILED DESCRIPTION

Figure 1:
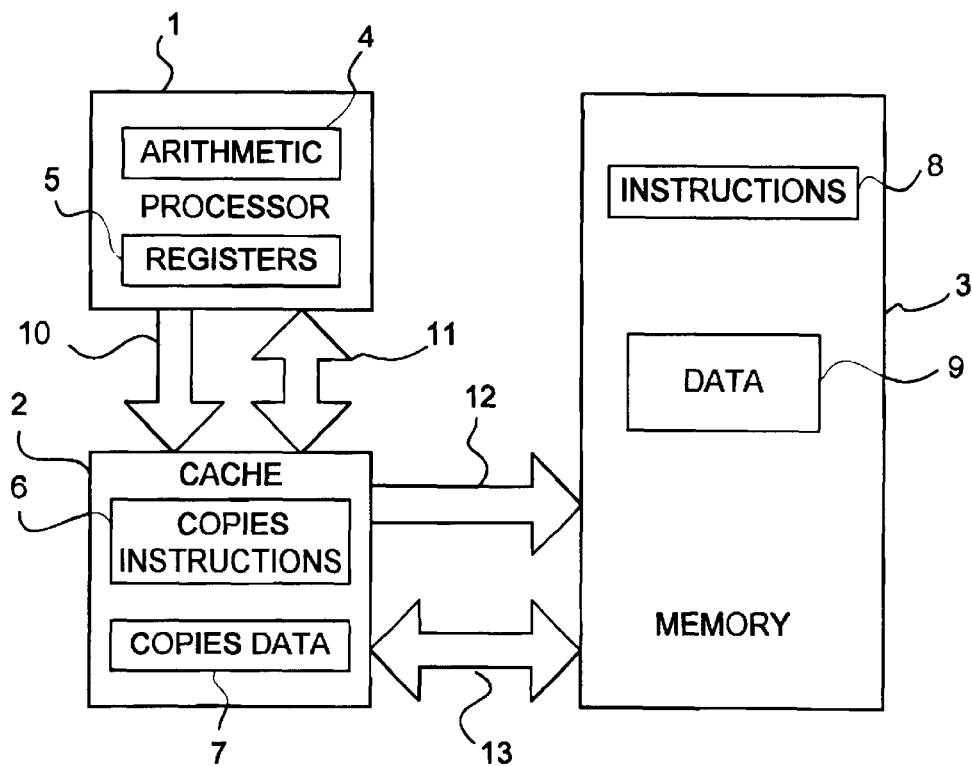
FIG. 1 is a schematic diagram of a known combination of a processor, cache and main memory.

FIG. 1 illustrates in much simplified form a known system including a processor 1, a cache 2 and a 'main' memory, typically a dynamic random access memory (DRAM) 3. The system, which is given only by way of example, employs a single cache for the caching of copies of instructions and copies of 'data'. Other systems where separate caches are employed for instructions and data respectively are known and could be used in the present invention. The processor, typically a microprocessor such as an ARM ®946 processor, has an arithmetic unit 4, and registers 5. The cache 2 may store copies of instructions and copies of data as shown schematically by references 6 and 7. The memory 3 can store both instructions 8 and data 9, typically in the specific example being considered packet data such as header data, including address data, VLAN (Virtual Local Area Network) data etc and status words. The processor can address the cache as shown by line or bus 10. The flow of instructions and/or data between processor and cache is shown by double-headed arrow or bus 11. Requests from the cache to the main memory to supply data as shown by arrow or bus 12 and the flow of instructions and/or data between memory and cache is shown by arrow or bus 13. It should be understood that the memory requests of the processor or central processing unit (CPU) are directed to the cache. Only in the event of a 'miss' the memory request is directed to the main memory.

FIG. 2 illustrates again in simplified form a known processor system including a processor, cache and memory as described with reference to FIG. 1. A bus system 21 connects these elements. Also attached to the bus is a direct memory access controller (DMA) 20. References 22 and 23 indicate ports which can receive data packets from or send data packets to other parts of a network switch in which the system is located to or other network devices.

Figure 2:
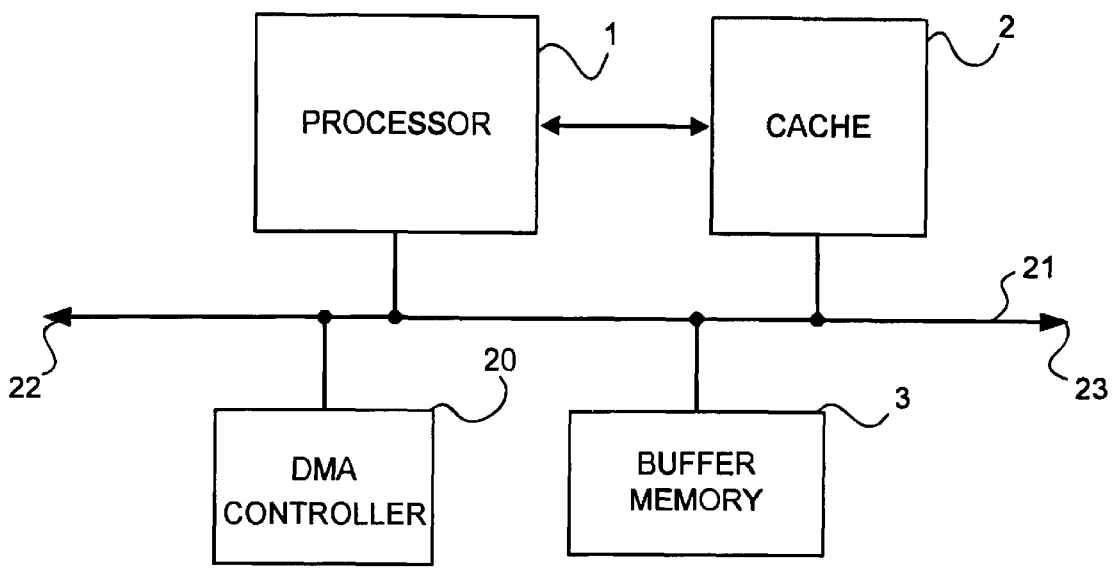
FIG. 2 is a schematic diagram of a known processor system.
Figure 3:
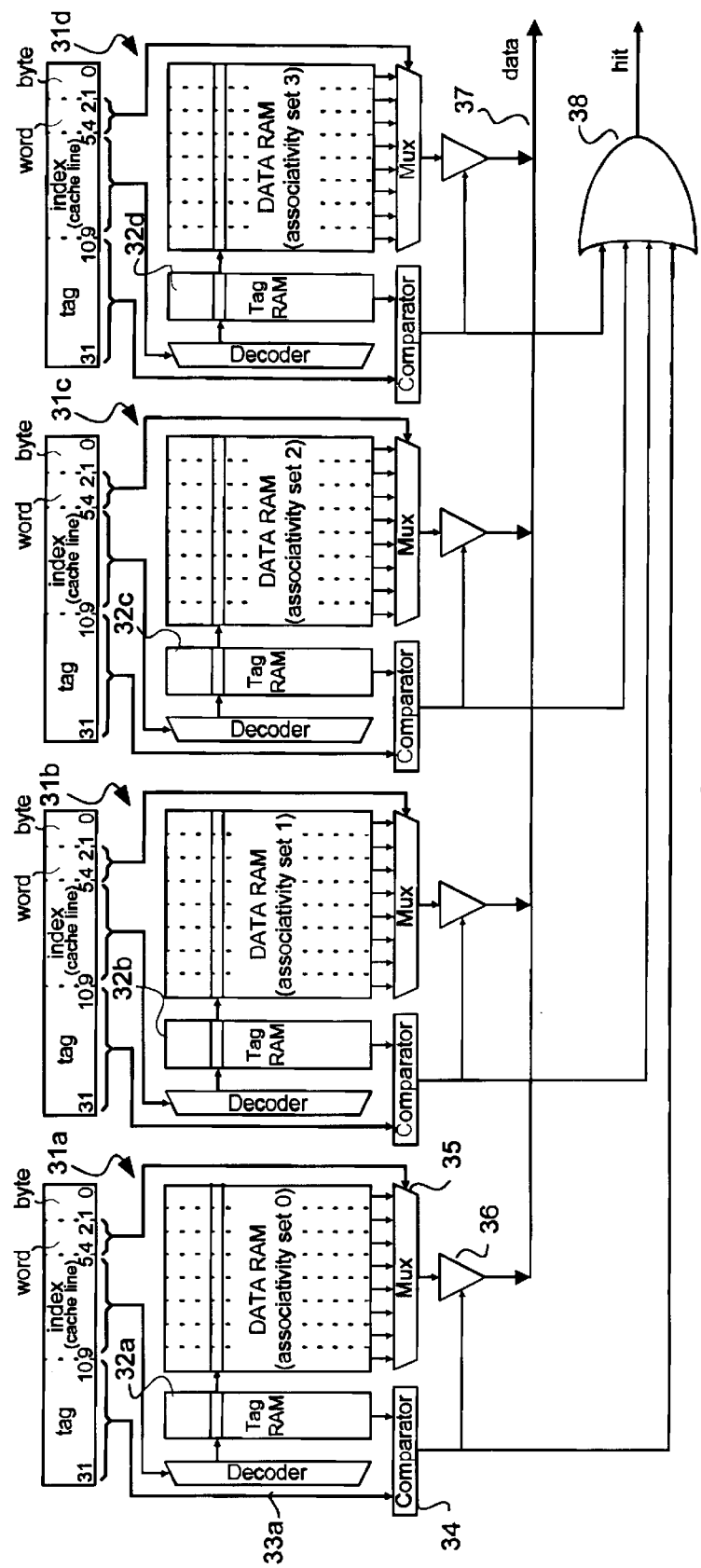
FIG. 3 is a schematic diagram of a known multiple-way set-associative cache memory.

FIG. 3 illustrates a typical four-way set-associative cache which may constitute a cache 2 as illustrated in FIGS. 1 and 2. The cache consists of four data random access memories (RAMs) 31a to 31d, a respective tag RAM 32a to 32d. A single set of the RAMs is a direct-mapped memory having single-way set-associativity. A decoder 33a for tag RAM 32a decodes the index (cache line) part of the address. A comparator 34 compares the tag with the output from the tag RAM to determine whether a 'hit' has occurred. The output of the comparator 34 enables output driver 36 coupled to multiplexer 35 to provide data on line 37. An OR gate 38 receives the outputs from the various comparators, one for each of the associated sets because a hit may be made in any of the individual sets. The multiplexer 35 is selected by the word part of the address input.

In the system shown in FIG. 2, the buffer memory is, in accordance with known practice, subdivided into a multiplicity of packet buffers, which may be represented as Packet_buffer[0] to Packet_buffer[31]. It is assumed that the buffer memory has not been excluded from the caching operation. In normal operation of a system shown in FIG. 2., the following operations take place:

(a) The DMA device copies a data packet from a port 22 or 23 to a packet buffer, herein for convenience called Packet_buffer[x] in the buffer memory. The DMA device then notifies the processor 1 and passes it the memory address pointer of that packet buffer, packet_buffer[x].

The first time the processor accesses packet data it will make a copy of the data and store it in the cache 2. This cache data will initially be consistent with data in the buffer memory. The processor will complete processing the packet, possibly directing the DMA device to copy the packet to a port.

Sometime later when a new packet arrives, the packet buffer, packet_buffer[x] will be reused. The DMA device will copy the new packet to the packet buffer. The DMA device will then notify the processor and pass it the same address pointer to packet_buffer[x]. As previously noted, the processor will assume that it holds the data in cache and will therefore read the wrong data.

The basis of the present invention is that the buffer memory should be aliased and in particular that the aliasing should be at least one greater than the set-associativity of the cache. Thus if the associativity of the cache is four, as shown in FIG. 3, the aliasing of the buffer memory should be at least five-fold. Typically, the aliasing may be eight-fold having regard to the ease of producing aliasing in powers of 2. The address alignment of each alias should be such that the pointer to packet buffer [x] has the same cache index in each case. In the case of a 4 kilobyte (4 Kbyte) cache with associativity 4, this would mean that the aliases should be separated by multiples of 1 Kbyte. Each time the DMA device loads a new packet into the packet_buffer[x] it will increment the pointer to the next alias in memory. The cache will perceive the buffer as residing at a new memory location and will load data afresh into the cache. The data will be loaded into the cache in the same index line but in a different associativity set. Since there is a limited number of aliases the pointer will eventually wrap around to the initial value. The original cache data is guaranteed to be overwritten provided that the cache replacement algorithm is round-robin and the associativity of the cache is at least one fewer than the multiplicity of aliasing in the memory.

Figure 4:
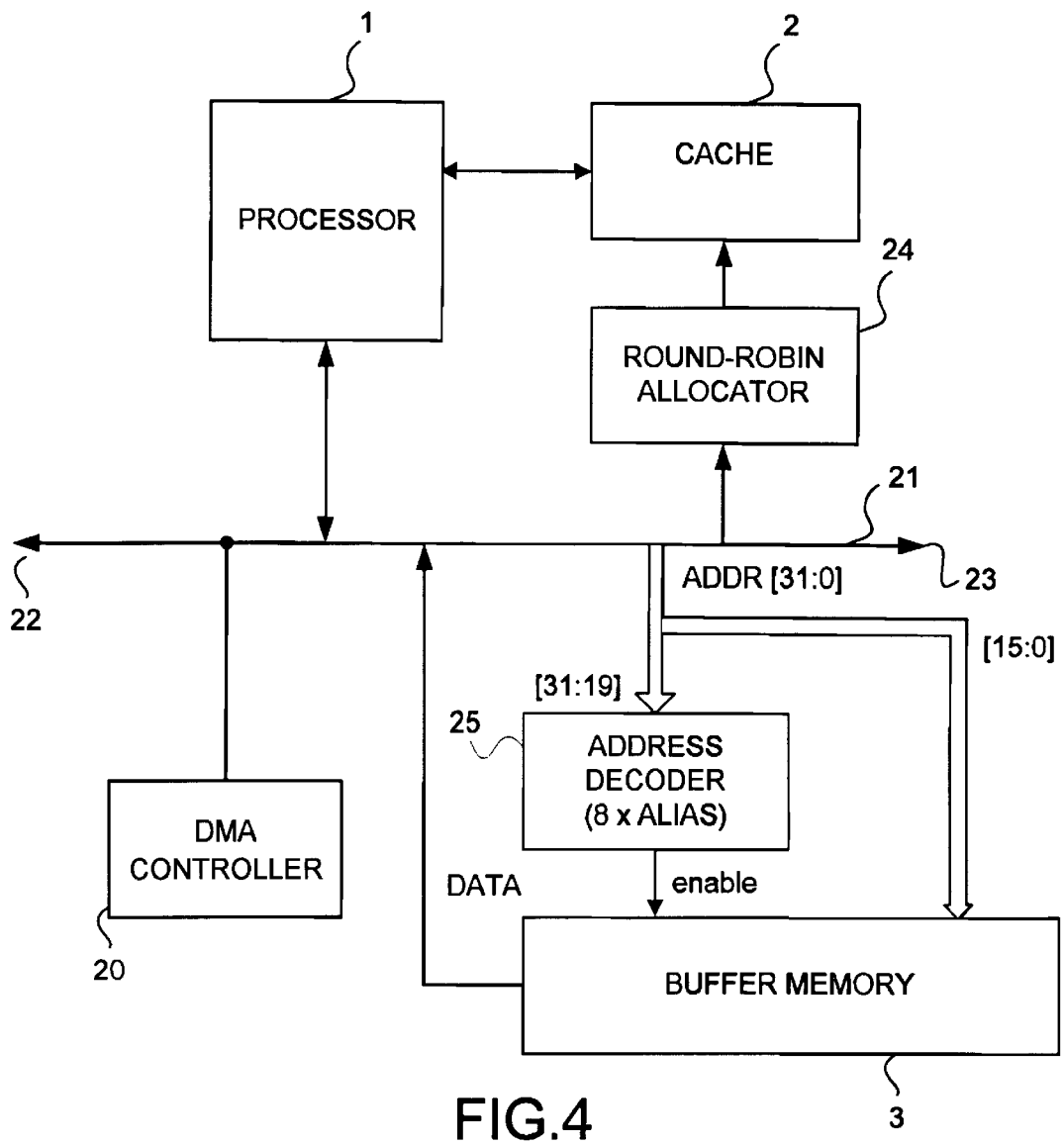
FIG. 4 is a schematic diagram of a data processing and storage system in accordance with the present invention.

More particularly, let it be supposed that the processor has a 4 Kbyte data cache. The cache has associativity 4 and each associativity set has 32 lines of 8×32-bit words. The cache is configured, as schematically illustrated in FIG. 4 with a round-robin allocator 24 so that updates to the associativity sets are performed in a round-robin fashion. Since address bits 0 to 9 are employed to address values within the cache it follows that an address (ADDR) will be stored in the same word location in the same line of the cache as an address (ADDR +N*1024). This is true for any integral value of N. Accordingly, if it is ensured that the packet buffer's aliases are separated by N*1024 in the address map then the equivalent words will be stored in the same word and in the same line of the cache, though possibly in another of the associativity sets.

Now let it be considered that the size of the whole packet buffer memory is 64 Kbytes, employing a 32-bit address word. Typically, the lower most address bits, ADDR[15:0] will be fed directly to a packet buffer memory block to access words within it. The address bits ADDR[31:16] would normally be fed into an address decoder. If ADDR [31:16] identifies packet buffer location [31:16] then the relevant enable pin of the address decoder would be activated.

However, aliasing of the packet buffer memory can be simply achieved in a specific embodiment by performing the address match ADDR[31:19] that is to say by omitting three bits from the address decode operation. This is shown by the address input to address decoder 25 in FIG. 4.

This method of aliasing has the effect that the packet buffer memory is repeated eight times in memory starting with packet_buffer_location[31:0], the first alias being the packet_buffer_location[31:0] +1*$2^{16}$ and the others being packet_buffer_location[31:0] +2*$2^{16}$. . . . , packet_buffer_location[31:0 ] +7*$2^{16}$.

If a single-way set-associativity cache memory is employed the round-robin allocator is not required and would be omitted.

What is claimed is:

1. A data processing and storage system comprising:

a data processor for processing data items received by the data processor;

a set-associative cache memory coupled to the data processor for storing the data items which are received by the data processor and for providing to said data processor data items in response to addressing by the data processor, said set associative cache memory having a plurality of similar associative memory sets addressed by means of a tag and a cache index such that addresses having the same cache index identify corresponding lines in the associative sets;

a round-robin allocator for controlling the storage of data items in the cache such that successive data items are stored in different ones of the associative memory sets of the cache in cyclic sequence;

a main memory comprising a multiplicity of addressable buffers, said main memory having an address decoder which causes a data item sent to the main memory to be aliased, the number of aliases being greater than N, and the address spacing of the aliases being such that the aliases have the same cache index; and a direct memory access device for storing data items in the main memory; and wherein:
  (a) the data processor reads data items from the main memory by means of an address pointer; and
  (b) the direct memory access device, on storing a data item in the main memory, provides to the data processor an incremental address pointer which identifies the next alias of that data item.

2. A data processing and storage system comprising:

a data processor for processing data items received by the data processor;

a single set cache memory coupled to the data processor for storing the data items which are received by the data processor and for providing to said data processor data items in response to addressing by the data processor, a main memory comprising a multiplicity of addressable buffers, said main memory having an address decoder which causes a data item sent to the main memory to be aliased, the address spacing of the aliases corresponding to the address space of the cache; and a direct memory access device for storing data items in the main memory; and wherein:
  (a) the data processor reads data items from the main memory by means of an address pointer; and
  (b) the direct memory access device on storing a data item in the main memory provides to the data processor an incremented address pointer which identifies the next alias of that data item.

* * * * *